C. E. VAN AUKEN.
FASTENING FOR CONNECTING ROD PINS.
APPLICATION FILED FEB. 25, 1908.
913,785.
Patented Mar. 2, 1909.
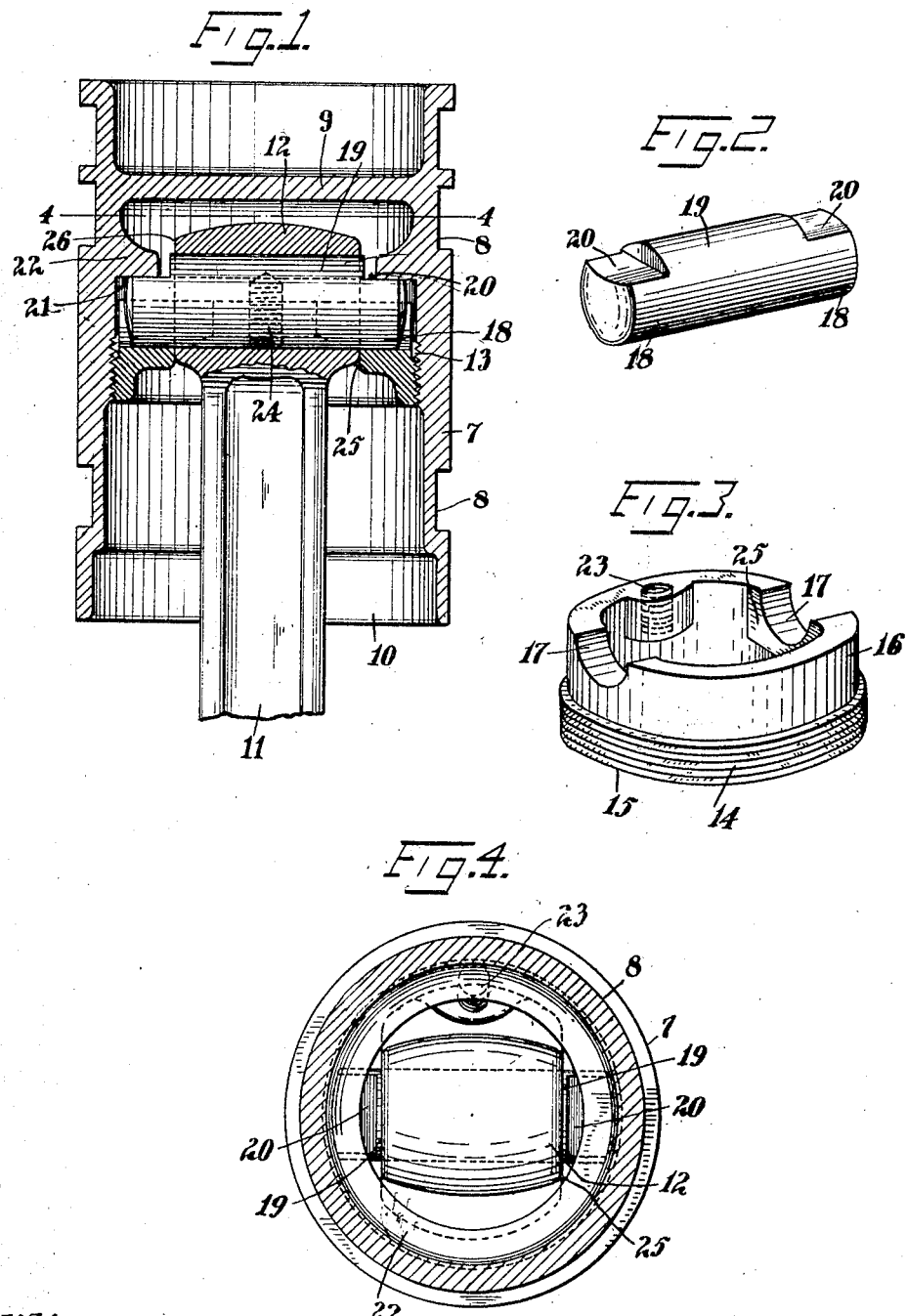

UNITED STATES PATENT OFFICE.

CLARENCE E. VAN AUKEN, OF BRIDGEPORT, CONNECTICUT, ASSIGNOR TO VAN AUKEN MOTOR & MACHINE WORKS, OF BRIDGEPORT, CONNECTICUT, A CORPORATION OF NEW YORK.

FASTENING FOR CONNECTING-ROD PINS.

No. 913,785.  Specification of Letters Patent.  Patented March 2, 1909.

Application filed February 25, 1908. Serial No. 417,742.

*To all whom it may concern:*

Be it known that I, CLARENCE E. VAN AUKEN, a citizen of the United States, residing in Bridgeport, in the county of Fairfield and State of Connecticut, have invented certain new and useful Improvements in Fastenings for Connecting-Rod Pins, of which the following is a specification.

This invention relates to improvements in pistons, and has for its object to provide means for securing a connecting-rod to a piston, and for fastening the connecting-rod pin to the piston.

Among the objects sought to be obtained herein is the provision of a piston closed throughout its entire cylinder engaging face; this provides a piston through which no leakage can take place and improvements in the connecting-rod-pin, the seat for this on the piston and a keeper for fastening the pin on the seat.

The piston will have a suitable seat for the connecting-rod-pin which will be so located that the expansive material employed in the cylinder will be prevented from escaping through the piston. A closed pin seat is provided in the outer end of the piston, the end opposite that which receives the working force of the expansive medium employed for driving the engine will thus be held in its proper place by the piston without leakage through the piston. This may well be accomplished in a structure employing a connecting-rod of ordinary form having a cylindrical bearing for the pin.

In the present practice of piston construction the piston is chambered out at its outside end and within this chamber the eye of the connecting-rod will be located. In a device constructed for embodying my present improvement this chamber having, of course, an open end, has upon its wall a screw thread for receiving a mating thread of a connecting-rod-pin fastening member. The fastening member will have recesses for embracing a connecting-rod-pin, and the pin will be flattened at the ends and such flattened portion of the ends rest upon the radially disposed face of a flange projecting inwardly from the wall of the chamber, said face being directed toward said open end, and upon which face the pin will move in its rotation of the fastening member when this is being turned upon the screw thread. The face may properly be termed a pin seat. When the connecting-rod-pin is in direct engagement with an integral part of the piston the lines of force of the working impulse will pass from the piston to the connecting-rod directly through the pin.

In a two cycle engine the piston, as is well known, is employed for controlling the ports for the intake of the gaseous mixture and for the exhaust of such mixture, together with the products of combustion. In the form of pin seat which comprises a hole through the piston walls when the pin comes adjacent to the ports a leakage will frequently occur. In many instances the hole which constitutes the pin seat is bored through the piston at a packing ring groove and the packing ring is placed around the piston at such groove to assist in retaining the end of the pin in position and preventing the same engaging the surface of the cylinder, this being done for the protection of the cylinder. Thus it will be seen that, unless the packing has an absolute fit with all sides of the groove, when such groove comes opposite one of the ports there will be naturally a leakage through the pin seat. In the present construction there is no communication through the walls of the piston from one side to the other of the piston.

In the drawings accompanying and forming a part of this specification Figure 1 is a central vertical section of a piston embodying a form of my present improvement. Fig. 2 is a perspective view of the connecting rod pin illustrated in Fig. 1. Fig. 3 is a perspective view of the connecting rod pin fastening member illustrated in Fig. 1; and Fig. 4 is a cross section taken in about the plane of line 4—4 of Fig. 1, looking down.

The piston 7 herein illustrated is such as is frequently employed in internal combustion engines, and is provided on its outside with a number of packing ring grooves, designated without preference by the reference character 8. This piston is formed, as many pistons of its class are, substantially hollow, with a partition 9 located nearer the end of the piston which will be exposed to the impulses of the expansive medium employed than it is to the open end 10 which is directed toward the outside; in four cycle engines exposed to the atmosphere; and in two cycle engines exposed to the crank case which is employed as the compression chamber. Within the portion of the piston which is chambered at this outer end, namely the chamber between the partition 9 and the open end 10, will be received the end of the connecting rod 11 which carries the pin engaging eye 12. The inner wall of the chamber at one place is provided with a screw thread 13 with which will engage a mating screw thread 14 upon a connecting-rod-pin fastening member or keeper 15. This keeper or member has a flange portion 16 provided with recesses 17 for engaging the ends, as 18, of a connecting-rod-pin, as 19. The keeper will be passed over the end of the connecting-rod, and the connecting-rod-pin will be placed in the eye 12 of the connecting-rod before this is passed through the open end 10 of the chamber within the piston. The parts will thus be passed through this open end, the fastening member or keeper 15 will be placed in position with the recesses 17 engaging the ends 18 of the pin, and by rotation of these parts together the screw thread 14 will screw down upon the thread 13 and carry the faces 20 on the ends of the pin against the face 21 of a flange 22, which face 21 constitutes a pin seat directed or facing toward the open end 10. This face is disposed in a radial plane transverse to the longitudinal axis of the piston, and as the parts, the eye, the pin, and the fastening member, are rotated the faces 20 will move over the face 21 until the pin is securely held to its seat. After the pin has been secured upon its seat a punch may be inserted in the hole 23 and the face 21 spotted, after which a set screw, indicated by the dotted lines 24, may be screwed into the opening 23 for preventing the accidental turning of the member 15. The engagement of the faces 20 and 21 holds the pin from rotation or oscillation with the movement of the connecting-rod relative to the piston, thus avoiding the wearing away of the pin seat and of the pin at its seat engaging portions. The eye or bearing of the connecting rods turns on the pin which is held from movement relative to the piston.

The member 15 is shown provided with faces 25 for engaging the face 26 upon the ends of the eye 12. This will prevent longitudinal play of such eye; otherwise, lateral play of the connecting rod 11.

It is a simple matter to tighten the pin as this may become worn at its pionts of connection with the piston, and if it is desired to change the angular relation of the piston and its cylinder the face 20 of the pin may be ground down slightly so that the fastening member will bring the pin to its seat at a different position to that which it previously occupied.

It will be seen that in this improvement the pin will be inserted and removed through the open end of the piston, and that the seat for the pin has no connection with the outside of the piston except through such open end.

Having described my invention I claim:

1. The combination with a piston having a chamber within it provided with an open end, and a connecting-rod-pin seat therein facing toward said open end, of a pin constructed and adapted to seat upon said seat through said open end and having a cylindrical centrally disposed connecting-rod engaging portion and flattened seat engaging end portions, and means normally constituted for removal for holding the pin on said seat.

2. The combination with a piston having a chamber within it provided with an open end, and a connecting-rod-pin seat therein facing toward said open end, of a pin constructed and adapted to seat upon said seat through said open end, the interior of said chamber being provided with screw threads, and a screw threaded keeper thereon for pressing the pin to the seat.

3. The combination with a piston having a chamber within it provided with an open end, a screw thread upon the interior of said chamber, and a pin seat facing toward said open end, of a pin constructed and adapted, to seat upon said seat through said open end, and a fastening member having a screw thread for mating with the screw thread in said chamber and having a portion for embracing the pin for holding the same to its seat.

4. The combination with a connecting-rod-pin having flattened ends, of a fastening member having a screw thread upon it and portions for engaging the pin adjacent to said flattened ends, and a piston having an open ended chamber, a screw thread for mating with the screw thread on said fastening member, and a flat seat disposed in a radial plane to engage said flattened ends of the pin and permit movement of the same with the fastening member while this is being turned upon said screw thread.

CLARENCE E. VAN AUKEN.

Witnesses:
J. H. CROSSLEY,
R. W. CASE.